United States Patent [19]

Rossi

[11] Patent Number: 5,690,384
[45] Date of Patent: Nov. 25, 1997

[54] VEHICLE SEAT WITH REMOVABLE SEAT MEMBER

[76] Inventor: Nicole E. Rossi, 43473 Golden Meadow Cir., Ashburn, Va. 20147

[21] Appl. No.: 699,824

[22] Filed: Aug. 20, 1996

[51] Int. Cl.⁶ ................................................. A47C 27/00
[52] U.S. Cl. ........................... 297/283.1; 297/283.2; 297/228.13
[58] Field of Search ............... 297/283.1, 283.2, 297/283.3, 228.13

[56] References Cited

U.S. PATENT DOCUMENTS

| | | | |
|---|---|---|---|
| 656,391 | 8/1900 | Conrad | 297/283.1 |
| 673,457 | 5/1901 | Sawyer | 297/283.1 X |
| 769,876 | 9/1904 | Schuster | 297/283.1 |
| 1,917,904 | 7/1933 | Sallop. | |
| 1,954,376 | 4/1934 | Brueckl. | |
| 2,521,339 | 9/1950 | Burn | 297/283.1 |
| 4,045,080 | 8/1977 | Barecki et al. | 297/283.2 |
| 4,061,396 | 12/1977 | Reida | 297/283.1 |
| 4,415,201 | 11/1983 | Wang | 297/283.1 X |
| 4,588,229 | 5/1986 | Jay | 297/228.13 X |
| 4,699,427 | 10/1987 | Kobayashi | 297/452 |
| 5,312,156 | 5/1994 | Heussner et al. | 297/238 |

FOREIGN PATENT DOCUMENTS 13942 of 1907 United Kingdom ............... 297/283.1

*Primary Examiner*—Laurie K. Cranmer
*Attorney, Agent, or Firm*—Rossi & Associates

[57] ABSTRACT

A vehicle seat includes a back support and a main seating support. At least one of the back support and the main seating support have a removable portion. The removable portion includes a first major side covered with a first material and a second major side covered with a second material. The removable portion is therefore reversible to allow the vehicle user to choose which material is exposed.

14 Claims, 2 Drawing Sheets

5,690,384

VEHICLE SEAT WITH REMOVABLE SEAT MEMBER

FIELD OF THE INVENTION

The invention generally relates to vehicle seats. More specifically, the invention relates to a vehicle seat including a removable seat portion, wherein first and second major sides of the removable seat portion are covered with different materials having different characteristics.

BACKGROUND

Vehicle seats are commonly upholstered with cloth (woven from either natural or synthetic fibers), natural leather, simulated leather products, molded or non-woven, sheet-like synthetic materials (Vinyl) or various combinations thereof. A common problem with vehicle seats upholstered with natural leather, simulated leather products or synthetic materials is the tendency of such materials to become extremely hot when the vehicle is parked in the sun. Accordingly, drivers frequently are required to cover the seats of their vehicles with a towel or blanket to enable the driver to sit in the vehicle seat. It is an object of the present invention to provide a vehicle seat that overcomes the problem described above.

SUMMARY OF THE INVENTION

The invention provides a vehicle seat including a back support and a main seating support. At least one of the back support and the main seating support have a removable portion. The removable portion includes a first major side covered with a first material and a second major side covered with a second material. The removable portion is therefore reversible to allow the vehicle user to choose which material is exposed.

In a preferred embodiment, the removable portion is a central portion, the first material is at least one of a natural leather, a simulated leather, a molded synthetic material and a non-woven, sheet-like synthetic material, and the second material is a cloth. The removable portion is shaped to fit snugly into a corresponding cavity in the seat, thereby avoiding the necessity of a fastening mechanism. If desired, however, a fastening mechanism can be provided, including hook-and-loop fasteners, a mechanical latching mechanism and/or alignment pins.

DETAILED DESCRIPTION OF THE DRAWINGS

The invention will be described with reference to certain preferred embodiments thereof along with the accompanying figures, wherein.

DETAILED DESCRIPTION OF THE PREFERRED EMBODIMENTS

Figure 1:
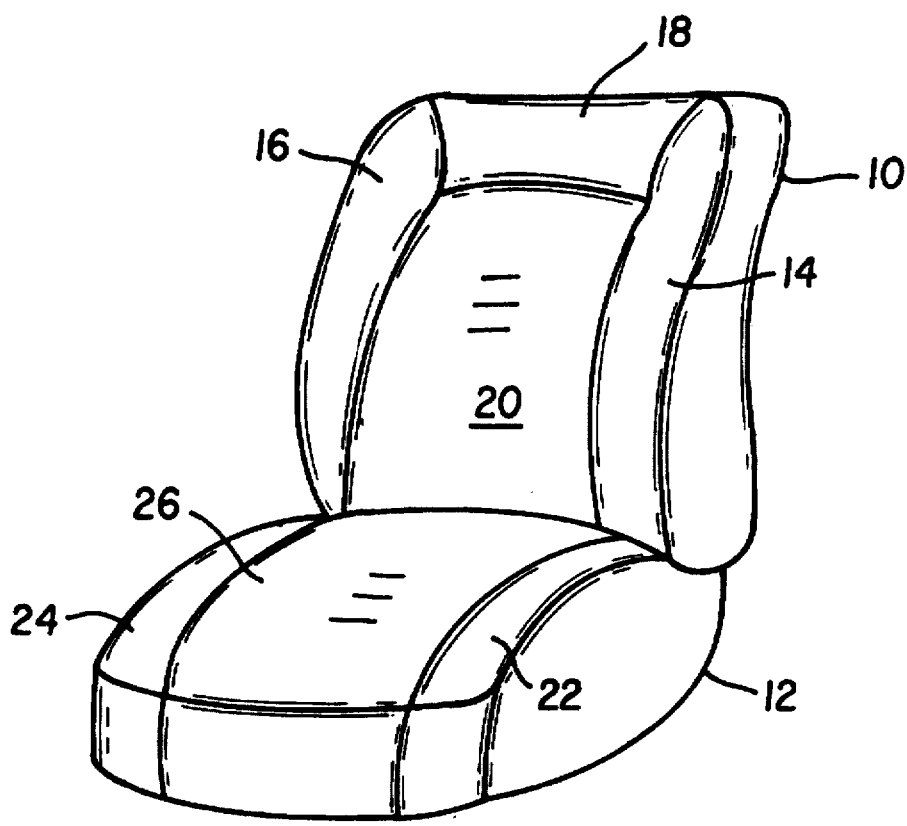
FIG. 1 is a front perspective view of a vehicle seat in accordance with the invention.
Figure 2:
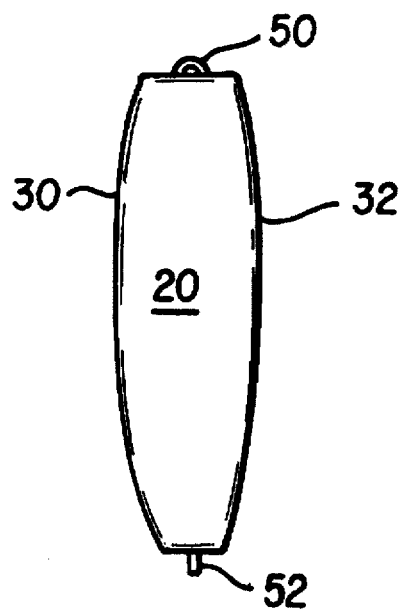
FIG. 2 is a side view of a removable central portion of a back support of the vehicle seat illustrated in FIG. 1.
Figure 3:
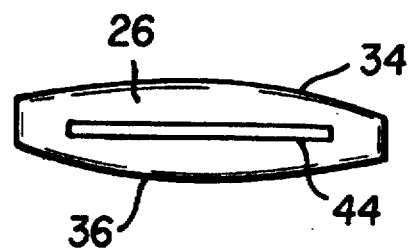
FIG. 3 is a side view of a removable central portion of a main seating support of the vehicle seat illustrated in FIG. 1.

FIG. 1 illustrates a vehicle seat in accordance with the invention. The vehicle seat includes a back support 10 and a main seating support 12. The back support 10 includes fixed side bolster portions 14, 16, a fixed top bolster portion 18, and a removable central portion 20. The exposed faces of the side bolster portions 14, 16 and the top bolster portion 18 are covered with a first material; for example, a natural leather. As shown in FIG. 2, the removable central portion 20 has a first major side 30 preferably covered with the same material as the side bolsters portions 14, 16 and the top bolster portion 18, and a second major side 32 opposite the first major side 30 covered with a second material; for example, a woven cloth material. Similarly, the main seating support 12 includes fixed side bolster portions 22, 24 and a removable central portion 26. The fixed side bolster portions 22, 24 are preferably covered with the same first material as the side bolster portions 14, 16 of the back support 10. As shown in FIG. 3, the removable central portion 26 includes a first major side 34 covered with the first material and a second major side 36, opposite the first major side 34, preferably covered with the same second material as the second major side 32 of the removable central portion 20 of the back support 10.

Figure 4:
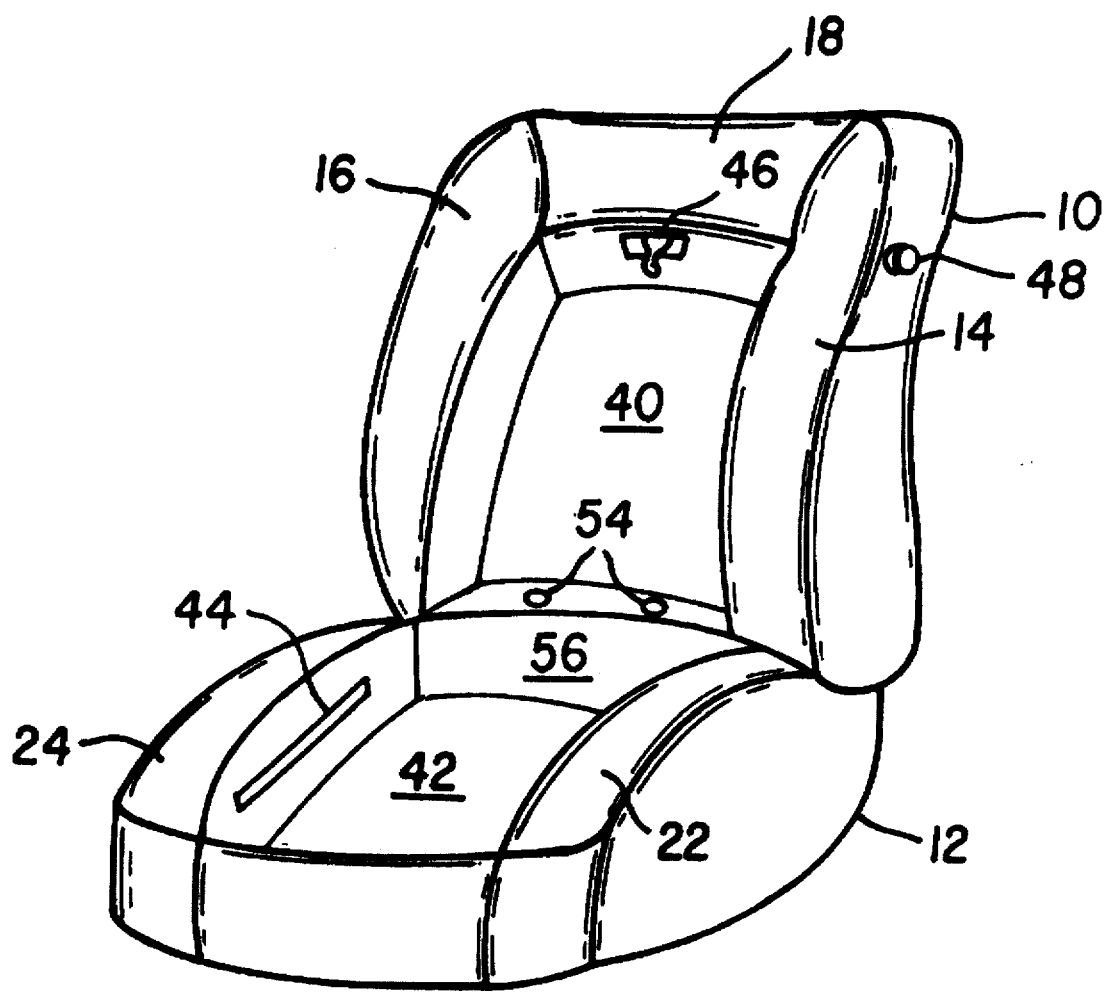
FIG. 4 is a front perspective view of the vehicle seat of FIG. 1 with the central portions of FIGS. 2 and 3 removed.

FIG. 4 illustrates the above-described vehicle seat with the central portions 20 and 26 removed. A cavity 40 is formed in the back support 10 that substantially conforms and corresponds to the shape of the removable central portion 20. A cavity 42 also is formed in the main seating support 12 that substantially conforms and corresponds to the shape of the removable central portion 26. The central portions 20, 26 are preferably shaped to fit snugly into their respective cavities, 40, 42, thereby avoiding the necessity of a fastening mechanism.

If desired, however, various types of fastening mechanisms can be employed to help retain the central portions 20, 26 in the cavities 40, 42. For example, hook-and-loop fastener (VELCRO) strips 44 can be provided along one or more sides of the cavities 40, 42 and corresponding sides of the central portions 20, 26. Alternatively, a mechanical latching system 46, operated by a control mechanism 48 provided on a side of the seat, can be employed to engage a latching member 50 provided in the central portions 20, 26. In such a case, it might also be desirable to include alignment pins 52 (see FIG. 2) and alignment holes 54 in the seat frame 56 (as shown in FIG. 4) to facilitate the alignment of the central portion utilizing the latching member 48. Still further, the central portions 20, 26 may include flexible extended portions that engage recesses in the sides of the cavities 40, 42 or vice versa.

The removable central portions 20, 26 enable the vehicle user to alternate between which type of material will be exposed. On extremely hot days, for example, the vehicle user can flip, either individually or both, the central portions 20, 26 so that the second major sides covered with cloth are exposed. In the evening, to attend a formal occasion for example, the vehicle user can then reverse the central portions 20, 26 to expose the first major side covered with the natural leather. Any desired combination is possible.

The invention has been described with reference to certain preferred embodiments thereof. If will be understood, however, that modifications and variations are possible within the scope of the appended claims. For example, more than one removable portion can be provided on either the back support 10 or the main seating support 12. In addition, the removable portions need not be central portions. Further, a removable portion can be provided, if desired, on only one of the back support 10 and the main seating support 12. Still further, the invention is applicable to integrated child safety seats that fold out from a main seat, wherein a portion of the seat that folds out has a different material on the surface exposed when the safety seat is folded out as opposed to the material on the surface exposed when the safety seat is folded and stored. Still further modifications are possible within the scope of the claims.

What is claimed:

1. A vehicle seat comprising:
   a back support including at least one of a bed side bolster and a fixed top bolster; and a main seating support including at least one fixed side bolster,
   wherein at least one of the back support and the main seating support includes a removable central portion located adjacent to at least one of said bolsters;
   wherein said removable central portion includes a first major side covered with a first material and a second major side covered with a second material that is different from the first material; and
   wherein said removable central portion includes at least one of a flexible extended portion and a recess that engages a corresponding recess and a corresponding flexible extended portion respectively, in at least one of said side bolster of said back support, said too bolster of said back support and said side bolster of said main seating support.

2. A vehicle seat as claimed in claim 1, wherein said first material is at least one of a natural leather, a simulated leather, a molded synthetic material and a non-woven, sheet-like synthetic material, and wherein said second material is a cloth.

3. A vehicle seat as claimed in claim 1, further comprising fastening means for fastening said removable central portion to at least one of said back support and said main seating support.

4. A vehicle seat as claimed in claim 3, wherein said fastening means comprises at least one hook-and-loop fastener including a first fastener strip provided on at least one of said side bolster of said back support, said top bolster of said back support and said side bolster of said main seating support, and a second fastener strip provided on said removable central portion.

5. A vehicle seat as claimed in claim 3, wherein said fastening means comprises a mechanical latching mechanism.

6. A vehicle seat as claimed in claim 3, wherein said fastening means comprises alignment pins.

7. A vehicle seat as claimed in claim 1, wherein said first material and said second material have different heating characteristics.

8. A vehicle seat comprising:
   a back support including at least one of a fixed side bolster and a fixed top bolster; and a main seating support including at least one removable central portion, wherein said removable central portion of said back support is located adjacent to at least one of said fixed side bolster and said fixed top bolster of said back support; and
   a main seating support including at least one fixed side bolster, and at least one removable central portion, wherein said removable central portion of said main seating support is located adjacent to said fixed side bolster of said main seating support;
   wherein the removable central portion of the back support and the removable central portion of the main seating support each include a first major side covered with a first material and a second major side covered with a second material that is different from said first material; and
   wherein said removable central portion of said back support includes at least one flexible extended portion that engages a corresponding recess in at least one of said side bolster of said back support, said ton bolster of said back support, and wherein said removable central portion of said main seating support includes at least one flexible extended portion that engages a corresponding recess in at least one said side bolster of said main seating support.

9. A vehicle seat as claimed in claim 8, wherein said first material is at least one of a natural leather, a simulated leather, a molded synthetic material and a non-woven, sheet-like synthetic material, and wherein said second material is a cloth.

10. A vehicle seat as claimed in claim 8, further comprising fastening means for fastening at least one of said removable central portion of said back support to said back support and said removable central portion of said main seating support to said main seating support.

11. A vehicle seat as claimed in claim 10, wherein said fastening means comprises at least one hook-and-loop fastener including:
    a first fastener strip provided on at least one of said side bolster of said back support and said top bolster of said back support, and a second fastener provided on said removable central portion of said back support; and
    a third fastener strip provided on said side bolster of said main seating support, and a fourth fastener strip provided on said removable central portion of said main seating support.

12. A vehicle seat as claimed in claim 10, wherein said fastening means comprises a mechanical latching mechanism.

13. A vehicle seat as claimed in claim 10, wherein said fastening means comprises alignment pins.

14. A vehicle seat as claimed in claim 8, wherein said first material and said second material have different heating characteristics.

* * * * *

UNITED STATES PATENT AND TRADEMARK OFFICE
CERTIFICATE OF CORRECTION

PATENT NO. : 5,690,384
DATED : November 25, 1997
INVENTOR(S) : Nicole E. Rossi

It is certified that error appears in the above-indentified patent and that said Letters Patent is hereby corrected as shown below:

In claim 1, line 16, change "too" to --top--.

In claim 8, line 23, change "ton" to --top--.

Signed and Sealed this

Ninth Day of June, 1998

Attest:

BRUCE LEHMAN

Attesting Officer

Commissioner of Patents and Trademarks